US 8,381,215 B2

(12) United States Patent
Johnson et al.

(10) Patent No.: US 8,381,215 B2
(45) Date of Patent: Feb. 19, 2013

(54) METHOD AND SYSTEM FOR POWER-MANAGEMENT AWARE DISPATCHER

(75) Inventors: Darrin P. Johnson, San Jose, CA (US); Eric C. Saxe, Livermore, CA (US); Bart Smaalders, Menlo Park, CA (US)

(73) Assignee: Oracle America, Inc., Redwood City, CA (US)

( * ) Notice: Subject to any disclaimer, the term of this patent is extended or adjusted under 35 U.S.C. 154(b) by 1034 days.

(21) Appl. No.: 11/863,026

(22) Filed: Sep. 27, 2007

(65) Prior Publication Data

US 2009/0089782 A1 Apr. 2, 2009

(51) Int. Cl.
*G06F 9/46* (2006.01)

(52) U.S. Cl. ........ 718/102; 718/104; 718/105; 713/300; 713/320

(58) Field of Classification Search .................... None
See application file for complete search history.

(56) References Cited

U.S. PATENT DOCUMENTS

| 5,826,081 | A  | * | 10/1998 | Zolnowsky ............... 718/103 |
| 7,036,030 | B1 | * | 4/2006 | Altmejd .................. 713/322 |
| 7,043,405 | B2 |   | 5/2006 | Orenstien et al. |
| 7,958,508 | B2 |   | 6/2011 | Shimizu et al. |
| 2005/0050373 | A1 | * | 3/2005 | Orenstien et al. ........... 713/320 |
| 2005/0210472 | A1 |   | 9/2005 | Accapadi et al. |
| 2006/0095913 | A1 | * | 5/2006 | Bodas et al. ............... 718/100 |
| 2007/0074219 | A1 |   | 3/2007 | Ginsberg |
| 2008/0307238 | A1 | * | 12/2008 | Bieswanger et al. ....... 713/300 |
| 2009/0235260 | A1 |   | 9/2009 | Branover et al. |

OTHER PUBLICATIONS

Non-Final Office Action for U.S. Appl. No. 12/495,079 dated Feb. 24, 2012 (32 pages).

* cited by examiner

*Primary Examiner* — Emerson Puente
*Assistant Examiner* — Dong Kim
(74) *Attorney, Agent, or Firm* — Osha • Liang LLP (57) ABSTRACT

In general the invention relates to a system. The system includes processors each having a processing state. The system further includes a dispatcher operatively connected to the plurality of processors and configured to: receive a first thread to dispatch, select one of the processors to dispatch the thread to based on the processing state the processors and a power management policy, and dispatch the thread to the selected one of the plurality of processors.

16 Claims, 5 Drawing Sheets

METHOD AND SYSTEM FOR POWER-MANAGEMENT AWARE DISPATCHER

BACKGROUND

A modern computer system may be divided roughly into three conceptual elements: the hardware, the operating system, and the application programs. The hardware, e.g., the central processing unit (CPU), the memory, the persistent storage devices, and the input/output devices, provides the basic computing resources. The application programs, such as compilers, database systems, software, and business programs, define the ways in which these resources are used to solve the computing problems of the users. The users may include people, machines, and other computers that use the application programs, which in turn employ the hardware to solve numerous types of problems.

An operating system ("OS") is a program that acts as an intermediary between a user of a computer system and the computer hardware. The purpose of an operating system is to provide an environment in which a user can execute application programs in a convenient and efficient manner. A computer system has many resources (hardware and software) that may be required to solve a problem, e.g., central processing unit ("CPU") time, memory space, file storage space, input/output ("I/O") devices, etc. The operating system acts as a manager of these resources and allocates them to specific programs and users as necessary. Because there may be many, possibly conflicting, requests for resources, the operating system must decide which requests are allocated resources to operate the computer system efficiently and fairly.

Moreover, an operating system may be characterized as a control program. The control program controls the execution of user programs to prevent errors and improper use of the computer. It is especially concerned with the operation of I/O devices. In general, operating systems exist because they are a reasonable way to solve the problem of creating a usable computing system. The fundamental goal of a computer system is to execute user programs and make solving user problems easier. Toward this goal, computer hardware is constructed. Because bare hardware alone is not particularly easy to use, application programs are developed. These various programs require certain common operations, such as those controlling the I/O operations. The common functions of controlling and allocating resources are then brought together into one piece of software: the operating system.

In order to conserve energy, some computer systems incorporate power control mechanisms. For example, Energy Star ("E*") power requirements require system power consumption to be lowered to 15% of the normal operating power consumption level when the system is idle. In order to conserve power, the operating system turns off (or lowers the operating frequencies of) inactive devices, such as hard disks and monitors. The operating system may also conserve power by adjusting the execution of the CPU.

SUMMARY

In general, in one aspect, the invention relates to a system. The system includes a plurality of processors each having a processing state and a dispatcher operatively connected to the plurality of processors. The dispatcher is configured to receive a first thread to dispatch, select one of the plurality of processors to dispatch the thread to based on the processing state of each of the plurality of processors and a power management policy, and dispatch the thread to the selected one of the plurality of processors.

In general, in one aspect, the invention relates to a method for dispatching threads. The method includes receiving a first thread to dispatch, selecting one of a plurality of processors to dispatch the thread to based on a processing state of each of the plurality of processors and a power management policy, and dispatching the thread to the selected one of the plurality of processors.

In general, in one aspect, the invention relates to a computer readable medium comprising computer readable program code embodied therein for causing a computer system to receive a first thread to dispatch, select one of a plurality of processors to dispatch the thread to based on a processing state of each of the plurality of processors and a power management policy, dispatch the thread to the selected one of the plurality of processors, monitor utilizing of at least the selected one of the plurality of processors to obtain utilization data, and modify the processing state least one of the plurality of processors based on the utilization data and the power management policy.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to a method and system for dispatching threads. More specifically, embodiments of the invention relate to a dispatcher, which is configured to dispatch threads based on a power management policy and system information (i.e., information about the system on which the dispatcher is executing). The information may include, but is not limited to, information about the processing state of each processor in the system, information about the utilization of the processors in the system, and information about the temperature of the system (e.g., internal system temperature, temperature of a particular processor, etc.).

Figure 1:
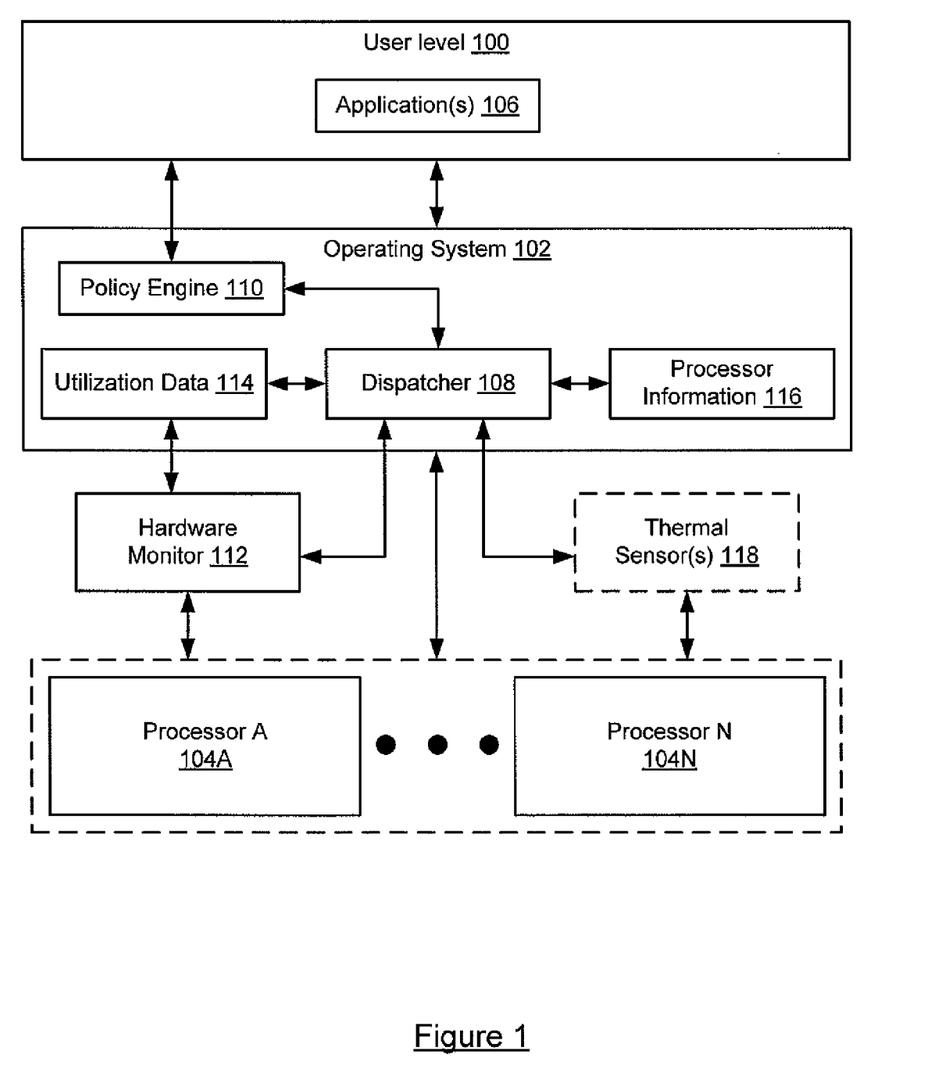
FIG. 1 shows a system in accordance with one embodiment of the invention.

FIG. 1 shows a system in accordance with one embodiment of the invention. The system includes a user level (100), an operating system (102), and one or more processors (104A, 104N). Each of the above components is described below.

In one embodiment of the invention, the user level (100) is the software layer of the system with which the user interacts. In addition, the user level (100) includes one or more applications (106). Examples of applications include, but are not limited to, a web browser, a text processing program, a web server, a transaction engine, a spreadsheet program, and a multimedia program. The applications (106) executing in the user level (100) require hardware resources of the system (e.g., memory, processing power, persistent storage, etc.). The applications (106) request hardware resources from the operating system (102).

The operating system (102) provides an interface between the user level (106) and the hardware resources. In one embodiment of the invention, applications (106) are executed using threads. In one embodiment of the invention, each thread corresponds to a thread of execution in an application (or in the operating system (102)). Further, threads may execute concurrently in a given application (106) (or in the operating system (102)). The execution of threads is managed by a dispatcher (108). The dispatcher (108) includes functionality to determine which threads are executed by which processors (104A, 104N) and to schedule the threads (i.e., determine the order in which the threads are executed (e.g., higher priority threads are placed ahead of lower priority threads)). The dispatcher (108) dispatches threads to the processors (104A, 104N) using a policy engine (110) (described below), utilization data (114) (described below), processor information (116) (described below) and, optionally, sensor (s) information (described below). The operation of the dispatcher (108) is discussed below in FIGS. 3-5.

In one embodiment of the invention, the processor information (116) may include one or more of the following pieces of information: (i) processing states supported by the processor, where each processing state corresponds to a specific operating frequency of the processor (i.e., clock speed of processor); (ii) power consumption at each processing state for each processor; (iii) current processing state of each the processor (i.e., current clock speed of processor); and (iv) the amount of power (kilowatt-hours) each processor is currently consuming.

In one embodiment of the invention, the policy engine (110) is configured to store power management policies. Alternatively, the policy engine (110) provides an interface to allow other processes (e.g., the dispatcher (108)) to access the power management policies. The policy engine (110) is further configured to determine which of the power management policies to use at a given time based on system information (e.g., utilization data (114), processor information (116), and sensor information) and/or user-preferences. In one embodiment of the invention, the policy engine (110) provides an interface (not shown) to allow a user (via the user level (100)) to: provide user-preferences, select a power management policy to use, modify an existing power management policy and/or provide new power management policies. In one embodiment of the invention, the policy may be obtained/set by a system management agent running as an application in the system, through a service processor feature/interface in the system, or by a user or management software external to the physical system.

In one embodiment of the invention, the power management policy defines how the dispatcher (108) dispatches threads based on system information and/or user-preferences. Further, the power management policy defines how the dispatcher (108) should initiate a decrease power consumption of processors and/or initiate an increase processing performance of processors in the system. In one embodiment of the invention, increasing processing performance of a processor corresponds to increasing the rate at which instructions are processed by the processor.

The following are examples of various power management policies. The following power management policies are included for exemplary purposes only and should be construed as limiting the invention.

Example Power Management Policy 1—The policy specifies a maximum allowed power consumption, which is less than the total of the maximum power consumption of all processors in the system. The policy also specifies how to coalesce/migrate the threads to a subset of available processors and power down the unused processors. The policy may be augmented to take into account all (or additional) power consumption related to executing the threads on the processors. For example, the policy may take into account power consumption of the cooling mechanisms associated with the processors (e.g., power to run fans to cool the processors). The policy may also be augmented to initially decrease the power consumption of the processors by decreasing the clock speed (as opposed to completely powering down the processors).

Example Power Management Policy 2—This policy provides processing power as needed; however, utilization data is used to determine whether there is insufficient processing power or excess processing power. The policy includes maximum latency requirements, which are used to determine whether there is insufficient processing power. The policy also includes utilization ranges, which are used to determine whether there is insufficient processing power or excess processing power. This policy may be augmented to define how to increase processing power and/or how to decrease processing power. For example, to increase processing power, the policy may define which processors to power up and the clock speed of each of the processors once they are powered up. Further, the policy may define the rate at which the processors are powered up and/or the rate at which the clock speed is increased. With respect to decreasing processing power, the policy may define how to decrease the clock speed and/or power supplied to the processor and the rate at which the decrease occurs. Further, the policy may also include functionality to coalesce/migrate threads prior to decreasing the power supplied to a given processor.

Example Power Management Policy 3—This policy defines how to dispatch threads based on the processing state of each of the processors in the system. For example, as processing state of a given processor changes, this information is used by the dispatcher to dispatch threads in a manner that maximize performance. For example, consider a system that includes two processors: processor 1 and processor 2. Processors 1 and 2 are initially operating at full power. Based on another power management policy (e.g., Example Power Management Policy 2), power supplied to processor 2 is decreased resulting in processor 2 transitioning to a slower processing rate (i.e., operating at a decreased clock speed). The dispatcher is notified of this change and when a subsequent high priority computing intensive thread is to be dispatched, the dispatcher sends the thread to processor 1 as opposed to processor 2. Similarly, if a low priority thread is to be dispatched, the dispatcher may send the thread to processor 2 so as to reserve processor 1 for processing of high priority threads. The processing state of each of the processors may be sent to the dispatcher via a notification mechanism, when a processing state of a given processor changes. In this manner, the dispatcher can rapidly adjust the manner in which threads are dispatched to continue to maximize performance.

Example Power Management Policy 4—This policy specifies how to increase power supplied to the processors in order to maximize the performance of the processors. Said another way, the policy specifies how to increase power such that there is a maximum increase in the resulting performance of the processors. For example, consider a system that includes four processors and assume that 20 units of additional power are available to supply to the processors. This policy is used to determine whether all the additional power is provided to one of the four processors, whether the additional power is evenly distributed across all four processors, or if the additional power is distributed across the four processors (or subset thereof) in an another manner. This policy may be used in conjunction with another policy (e.g., Example Power Management Policy 2).

Example Power Management Policy 5—This policy specifies environmental and/or external factors to take into account when the dispatching threads. For example, the policy may specify the maximum operating temperature for a given processor and/or for all processors in a system. Further, the policy may take into account the total power consumption of all systems in a rack, where the dispatcher is located in one of the system. In the later scenario, the dispatcher may implement a power savings policy (e.g., Example Power Management Policy 1) to decrease the overall power consumption of the rack.

Example Power Management Policy 6—This policy defines when specific power management policies should be applied and the duration for which they are applied. For example, this policy may specify that between 6:00 am and 6:00 pm Example Power Management Policies 2 and 4 should be applied and between 6:01 pm and 5:59 am Example Power Management Policy 1 should be applied.

Those skilled in the art will appreciate that any of the aforementioned policies may be pre-defined in the operating system, provided by the user, and/or modified by the user.

Continuing with the discussion of FIG. 1, as discussed above, the system includes one or more processors (104A, 104N). The processors (104A, 104N) may optionally include internal thermal sensors (not shown). Alternatively, the system may include an external thermal sensor(s) (118). The thermal sensor(s) (internal or external) is configured to monitor the temperature of the processors (104A, 104N) and/or the temperature of the system on which the processors (104A, 104N) are located. In one embodiment of the invention, the thermal sensor(s) monitors the temperature on a per-processor basis. The data collected by the thermal sensor(s) is communicated to the dispatcher (108), which may use the information to determine how to dispatch subsequently received threads. In one embodiment of the invention, the system may also include additional sensors (now shown), which monitor power consumption of the processors.

The system (102) further includes a hardware monitor(s) (112) configured to monitor the utilization of the processors. The hardware monitor(s) (112) may correspond to well known processor performance monitors, which record information related to the percentage of time a particular processor is in use (i.e., executing a thread) and the percentage of time the particular processor is idle. In one embodiment of the invention, the prior art performance monitors may be augmented to provide information about the percentage of time a processor is in a particular processing state (assuming that the processor supports more than two processing states).

Continuing with the discussion of FIG. 1, the hardware monitor(s) (112) provides the utilization data (114) to the operating system (102). The utilization data (114) may be temporarily stored in cache (e.g., L1 cache, L2 cache) or in memory (e.g., random access memory (RAM), Flash memory, etc.). Alternatively or in addition to, the utilization data (114) may be stored in persistent storage (not shown), which is accessible to the operating system (102).

Figure 2:
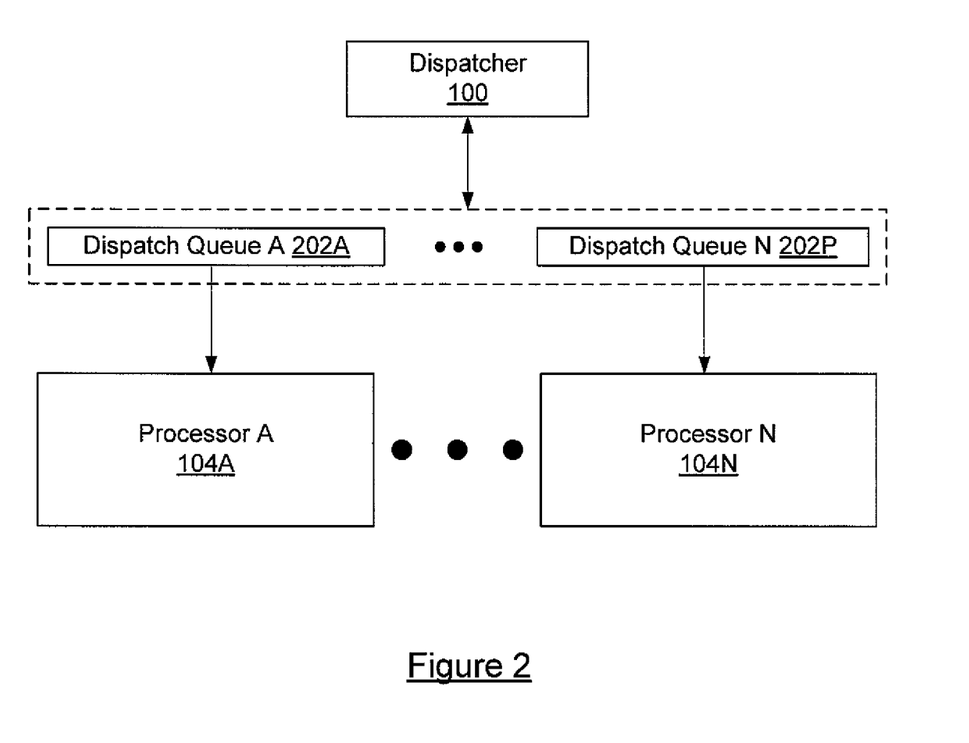
FIG. 2 shows a system in accordance with one embodiment of the invention.

FIG. 2 shows a system in accordance with one embodiment of the invention. Various details of the system are omitted in FIG. 2 for simplicity. In one embodiment of the invention, the dispatcher (100) is configured to assign threads to a given processor (104A, 104N) for execution. In one embodiment of the invention, the dispatcher (100) determines the particular processors (104A, 104N) which will execute the thread. Once this determination is made, the dispatcher (100) places the thread on the appropriate dispatch queue (202A, 202P). Those skilled in the art will appreciate that the order of the thread in the appropriate dispatch queue (202A, 202P) is determined using the priority of the thread and one or more well-known, priority-based thread scheduling algorithms. The processors (104A, 104N) subsequently execute the threads in the order in which they appear on the corresponding dispatch queue (202A, 202P).

Figure 3:
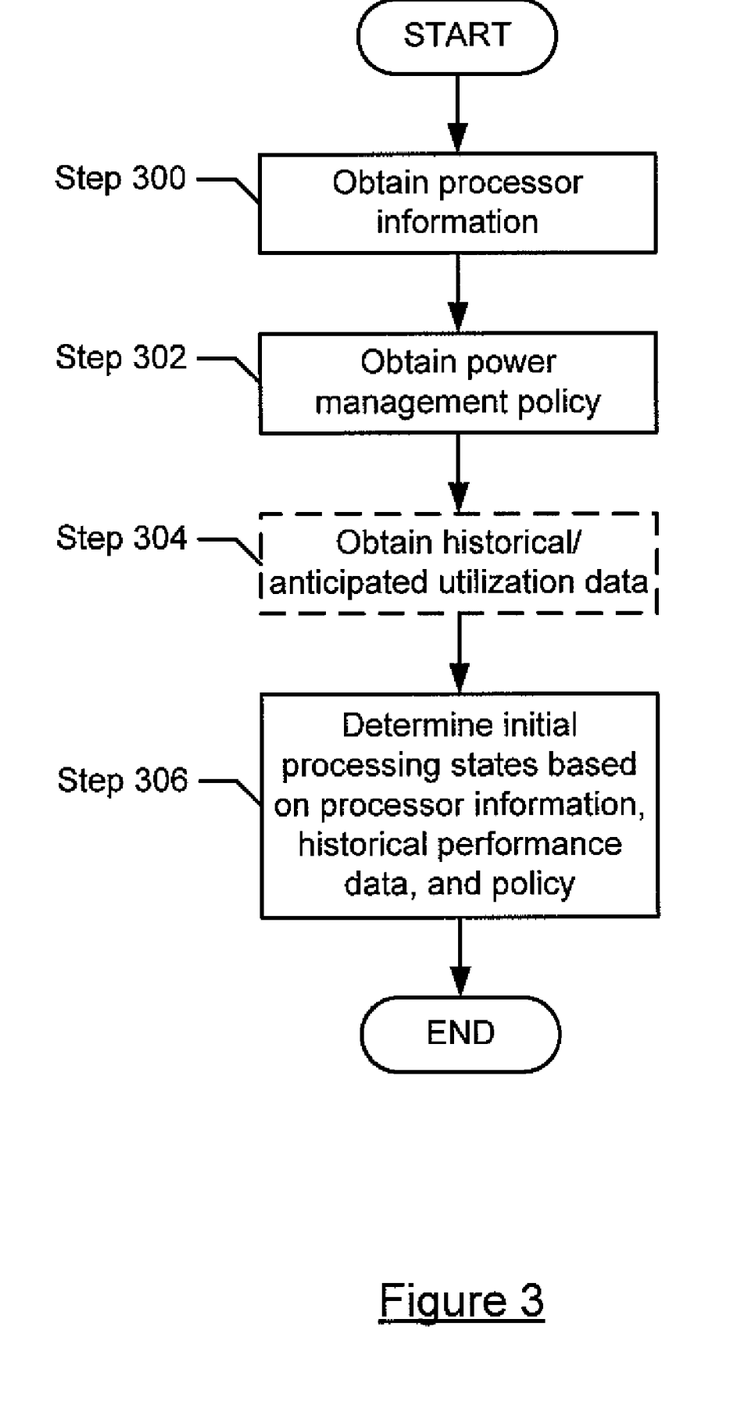
FIGS. 3-5 show flowcharts in accordance with one embodiment of the invention.
Figure 4:
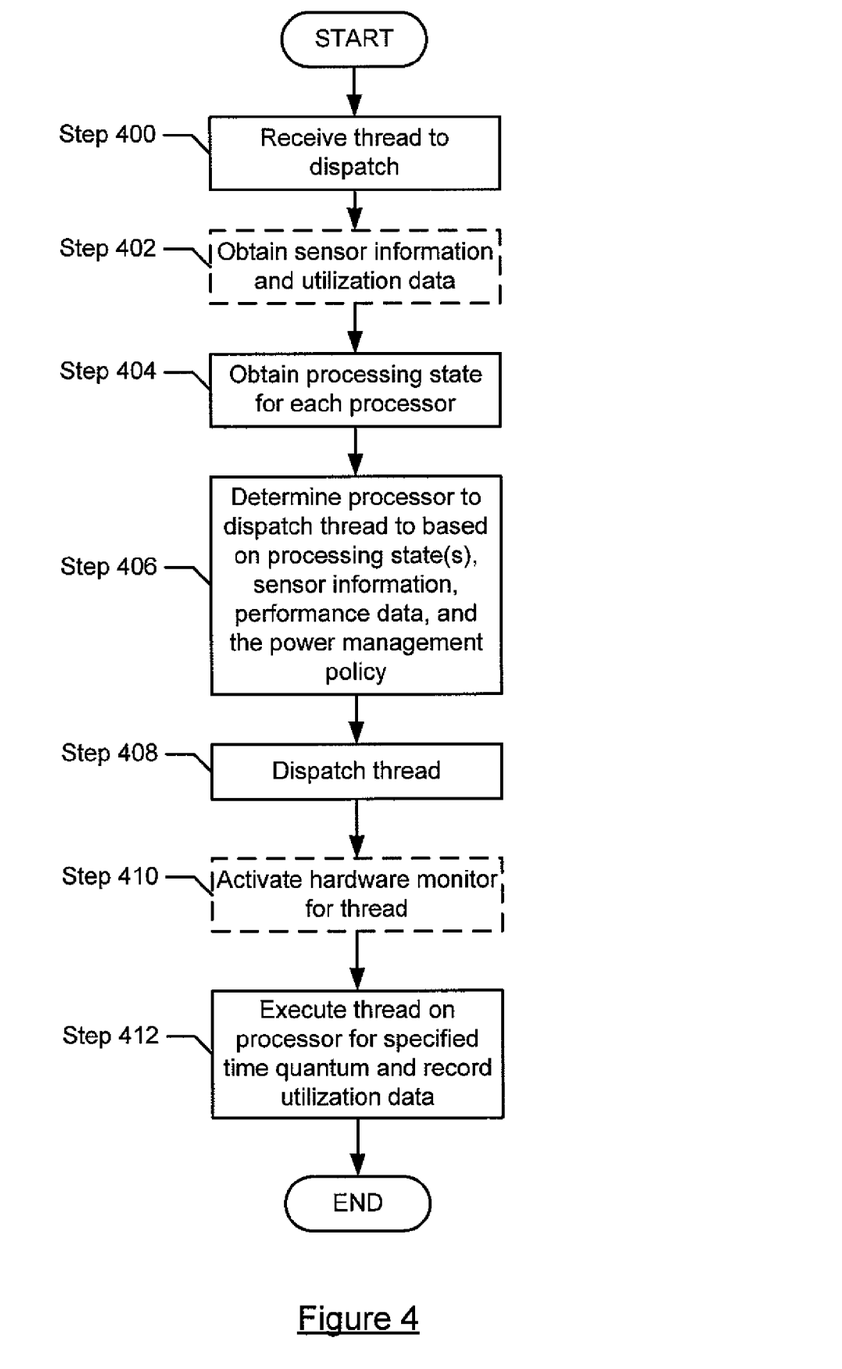
Figure 5:
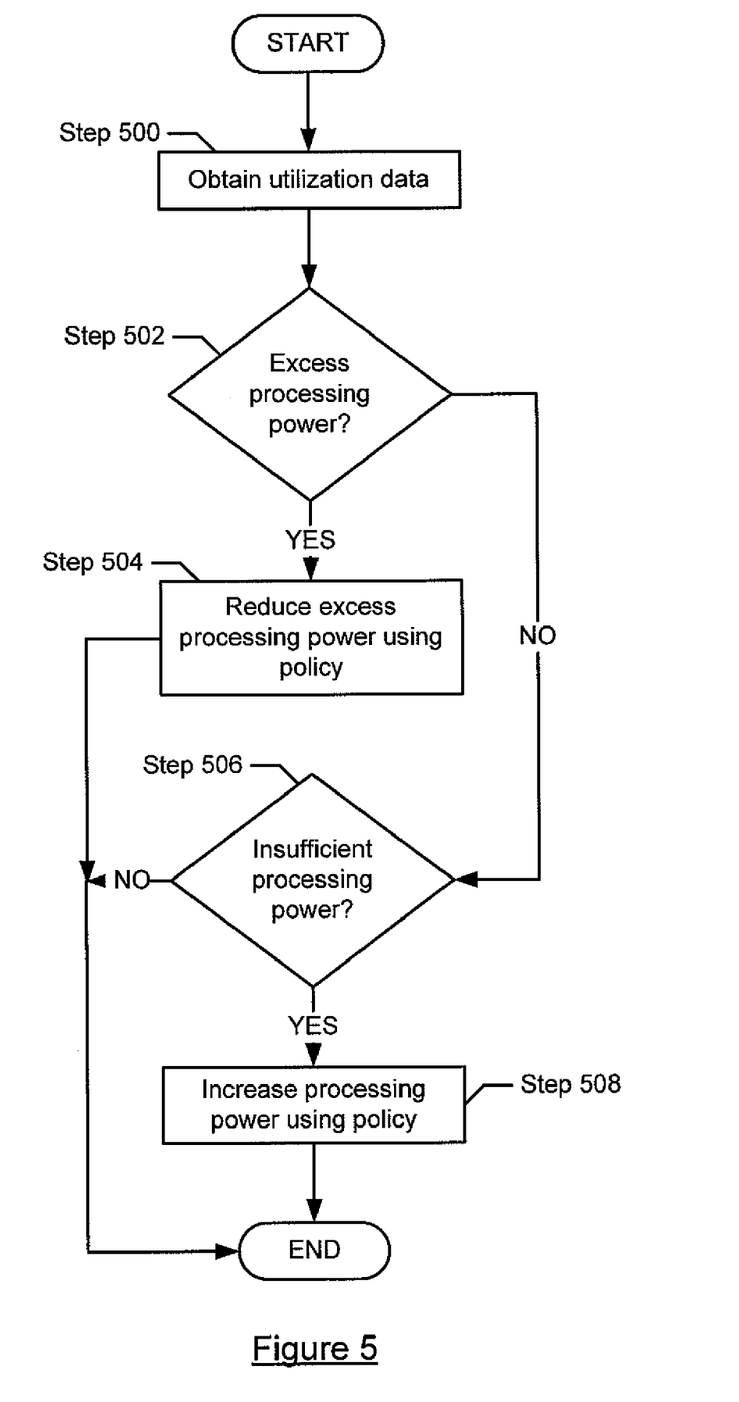

FIGS. 3-5 show flowcharts in accordance with one or more embodiments of the invention. While the various steps in the flowchart are presented and described sequentially, one of ordinary skill will appreciate that some or all of the steps may be executed in different orders and some or all of the steps may be executed in parallel.

FIG. 3 shows a flowchart in accordance with one or more embodiments of the invention. More specifically, FIG. 3 describes a method for initially setting up the system in accordance with one or more embodiments of the invention. In Step 300, processor information is obtained. In one embodiment of the invention, the processor information may be obtained by querying the operating system and/or querying the processors directly via the corresponding device drivers.

In Step 302, the power management policy is obtained. In one embodiment obtaining the power management policy corresponds to selecting the appropriate policy if more than one power management policy exists. The selection of the power management policy may be based on input from the user. Alternatively, a default power management policy made be obtained (e.g., Example Power Management Policy 6), where the default power management policy defines which of the other power management policies to select. Those skilled in the art will appreciate that other methods may be used to select the power management policy to apply. Further, Step 302 may include selecting multiple power management policies to apply simultaneous.

In Step 304, historical and/or anticipated utilization data is obtained. In one embodiment of the invention, the historical and/or anticipated utilization data defines historical utilization of the processors and/or the anticipated utilization of the processors. The anticipated utilization of the processors may be based on historical utilization data, a utilization model and/or user-input.

In Step 306, the initial processing states of the processors are determined using the information obtained in Steps 300-304. In one embodiment of the invention, the result of Step 306 is that one or more processors are power supplied with power and each processor to which power is supplied is set to operate a specified clock speed (i.e., processing state). Those skilled in the art will appreciate that the clock speed may be directly correlated with the amount of power supplied to the processor. In such cases, the power supplied to a given processor is regulated such that the processor operates at a particular clock speed.

FIG. 4 shows a flowchart in accordance with one or more embodiments of the invention. More specifically, FIG. 4 describes a method for dispatching a thread in accordance with one or more embodiments of the invention.

In Step 400, a thread to dispatch is received by the dispatcher. In Step 402, sensor information and/or utilization data is optionally obtained. Examples of sensor information include processor temperature, power consumption of processor, power consumption of cooling mechanisms, etc. In Step 404, the processing state for each of the processors in the system is obtained.

In Step 406, the dispatcher determines the processor to which to dispatch thread based on the processing states, sensor information (if available), performance data (if available), and the power management policy (i.e., the power management policy currently being applied by the dispatcher). The dispatcher may also take into account the relative computing requirements of the thread (e.g., high, medium, low) and the historical processor utilization of the thread or similar threads (e.g., threads from the same application).

In Step 408, the thread is dispatched to the dispatch queue associated with the processor selected in Step 406. In Step 410, the hardware monitor is optionally activated to record utilization of the processor by the thread. In Step 412, the thread is obtained from the dispatch queue and executed by the processor for a specified time quantum (i.e., period of time). The utilization data for the thread is optionally recorded using the hardware monitor activated in Step 410.

FIG. 5 shows a flowchart in accordance with one or more embodiments of the invention. More specifically, FIG. 5 shows a method for changing the processing power of a system.

In Step 500, performance data is obtained. In Step 502, a determination is made about whether there is excess processing power. In one embodiment of the invention, this determination is made based on the utilization data and the power management policy currently being applied by the dispatcher. For example, the utilization data may indicate that the available processors (i.e., processors that are powered up) are busy 50% of the time (over a given period of time) (i.e., the available processors are not executing threads 50% of the time). Further, the power management policy may specify that once the available processors are less than 75% busy, the processing power must be reduced 25%. The decrease in processing power may correspond to migrating threads to a subset of the available processors, powering down previously powered up processors and/or changing the processing state of a currently powered up processor to decrease its clock speed. In Step 504, if there is excess processing power (as defined by the power management policy), then the excess processing power is decreased in accordance with the power management policy. This process then ends.

If there is not excess processing power, then the process proceeds to Step 506. In Step 506, a determination is made about whether there is insufficient processing power. In one embodiment of the invention, this determination is made based on the utilization data and the power management policy currently being applied by the dispatcher. For example, the utilization data may indicate that the available processors are busy 80% of the time (over a given period of time) (i.e., the available processors are not executing threads 20% of the time). Further, the power management policy may specify that once the available processors are more than 75% busy, that additional processing power must be made available. The additional processing power may correspond to powering up previously powered down processors and/or changing the processing state of a currently powered up processor to increase its clock speed. In Step 508, if there is insufficient processing power (as defined by the power management policy), then the processing power is increased in accordance with the power management policy. This process then ends.

In one embodiment of the invention, the method shown in FIG. 5 may be executing in parallel with the method shown in FIG. 4. Further, FIG. 5 may be performed at specified time intervals defined by the user, defined a default schedule and/or any combination thereof. In one embodiment of the invention, the frequency at which FIG. 5 is performed is based on a balance between power consumption and system performance (which takes into account performance penalties associated with migrating threads, etc.).

The invention (or portions thereof), may be implemented on virtually any type of computer regardless of the platform being used. For example, the computer system may include a processor, associated memory, a storage device, and numerous other elements and functionalities typical of today's computers (not shown). The computer may also include input means, such as a keyboard and a mouse, and output means, such as a monitor. The computer system is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system may be located at a remote location and connected to the other elements over a network. Further, the invention may be implemented on a distributed system having a plurality of nodes, where each portion of the invention (e.g., dispatcher, the processors) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
    a plurality of processors each having a processing state;
    a plurality of dispatch queues associated with the plurality of processors, wherein each of the plurality of dispatch queues is configured to queue a plurality of threads in an execution order to be executed by an associated one of the plurality of processors;
    a dispatcher operatively connected to the plurality of processors and configured to:
        receive a first thread to dispatch;
        select a first processor of the plurality of processors to dispatch the first thread to based on the processing state of each of the plurality of processors and a power management policy to obtain a first selected processor, wherein the power management policy specifies how to increase processing performance of at least one of the plurality of processors when utilization data indicates over utilization;
        dispatch the first thread to a first dispatch queue of the plurality of dispatch queues, wherein the first dispatch queue is uniquely associated with the first selected processor;

receive a second thread to dispatch;
select a second processor of the plurality of processors to dispatch the second thread to based on the processing state of each of the plurality of processors and the power management policy to obtain a second selected processor;
dispatch the second thread to a second dispatch queue of the plurality of dispatch queues, wherein the second dispatch queue is uniquely associated with the second selected processor; and
migrate the first tread from the first dispatch queue to the second dispatch queue in response to a change in the utilization data;
modify the processing state of at least one of the plurality of processors based on the utilization data and the power management policy; and
a hardware monitor configured to monitor utilization of at least the first selected of processor to obtain the utilization data.

2. The system of claim 1, wherein the power management policy further specifies how to decrease power consumption of at least one of the plurality of processors when the utilization data indicates low utilization of at least one of the plurality of processors.

3. The system of claim 2, wherein the power consumption is decreased by migrating all threads executing in the system to a subset of the plurality of processors.

4. The system of claim 2, wherein the power consumption is decreased by decreasing a clock speed of at least one of the plurality of processors.

5. The system of claim 1, wherein the processing performance is increased by one selected from a group consisting of increasing a clock speed of at least one of the plurality of processors and increasing power supplied to the plurality of processors, wherein the power management policy specifies an amount of additional power to supply to each of the plurality of processors.

6. The system of claim 1, further comprising:
a temperature sensor, configured to monitor temperature of at least one of the plurality of processors to obtain temperature data,
wherein the dispatcher is further configured to modify the processing state of at least one of the plurality of processors based on the utilization data, the temperature data, and the power management policy.

7. The system of claim 1, wherein the dispatcher is further configured to:
receive notification of a change in the processing state of at least one of the plurality of processors;
select a new power management policy based on the change in the processing state of at least one of the plurality of processors; and
apply the new power management policy to dispatch a third thread, wherein the third thread is received after the selection of the new power management policy.

8. The system of claim 1, wherein the processing state of each one of the plurality of processors comprises an operating frequency of the one of the plurality of processors.

9. A method for dispatching threads comprising:
receiving a first thread to dispatch;
selecting a first processor of a plurality of processors to dispatch the first thread to based on a processing state of each of the plurality of processors and a power management policy to obtain a first selected processor,
wherein the plurality of processors is associated with a plurality of dispatch queues,
wherein each of the plurality of dispatch queues is configured to queue a plurality of threads in an execution order to be executed by an associated one of the plurality of processors,
wherein the power management policy specifies how to increase processing performance of at least one of the plurality of processors when the utilization data indicates over utilization,
wherein the power management policy defines a rate at which the plurality of processors is powered up, and
wherein the power management policy is used to determine whether all additional power is provided to one of the plurality of processors;
dispatching the first thread to a first dispatch queue of the plurality of dispatch queues, wherein the first dispatch queue is uniquely associated with the first selected processor;
receiving a second thread to dispatch;
selecting a second processor of the plurality of processors to dispatch the second thread to based on the processing state of each of the plurality of processors and the power management policy to obtain a second selected processor;
dispatching the second thread to a second dispatch queue of the plurality of dispatch queues, wherein the second dispatch queue is uniquely associated with the second selected processor;
monitoring utilizing of at least the selected one of the plurality of processors to obtain utilization data; and
modifying the processing state of one at least of the plurality of processors based on the utilization data and the power management policy.

10. The method of claim 9, further comprising, prior to receiving the first thread to dispatch:
obtaining processor information for each of the plurality of processors;
determining an initial processing state for each of the plurality of processors based on the processor information for each of the plurality of processors and the power management policy.

11. The method of claim 10, wherein the initial processing state for each of the plurality of processors is further based on historical utilization data for the plurality of processors.

12. The method of claim 10, wherein the initial processing state for each of the plurality of processors is further based on anticipated utilization data for the plurality of processors.

13. A non-transitory computer readable medium comprising computer readable program code embodied therein for causing a computer system to:
receive a first thread to dispatch;
select a first processor of a plurality of processors to dispatch the first thread to based on a processing state of each of the plurality of processors and a power management policy to obtain a first selected processor,
wherein the plurality of processors is associated with a plurality of dispatch queues,
wherein each of the plurality of dispatch queues is configured to queue a plurality of threads in an execution order to be executed by an associated one of the plurality of processors,
wherein the power management policy specifies how to increase processing performance of at least one of the plurality of processors when the utilization data indicates over utilization,
wherein the power management policy defines a rate at which the plurality of processors is powered up, and wherein the power management policy is used to determine whether all additional power is provided to one of the plurality of processors;
dispatch the first thread to a first dispatch queue of the plurality of dispatch queues, wherein the first dispatch queue is uniquely associated with the first selected processor;
receive a second thread to dispatch;
select a second processor of the plurality of processors to dispatch the second thread to based on the processing state of each of the plurality of processors and the power management policy to obtain a second selected processor;
dispatch the second thread to a second dispatch queue of the plurality of dispatch queues, wherein the second dispatch queue is uniquely associated with the second selected processor;
monitor utilizing of at least the selected one of the plurality of processors to obtain utilization data; and
modify the processing state of at least one of the plurality of processors based on the utilization data and the power management policy.

14. The non-transitory computer readable medium of claim 13, wherein the power management policy further specifies how to decrease power consumption of at least one of the plurality of processors when the utilization data indicates low utilization of at least one of the plurality of processors.

15. The non-transitory computer readable medium of claim 14, wherein the power consumption is decreased by at least one selected from a group consisting of migrating all threads executing in the system to a subset of the plurality of processors and decreasing a clock speed of at least one of the plurality of processors.

16. The non-transitory computer readable medium of claim 13, wherein selecting one of the plurality of processors to dispatch the first thread to is further based on a priority of the first thread.

* * * * *